United States Patent
Al-Otoom

(10) Patent No.: US 12,102,968 B2
(45) Date of Patent: Oct. 1, 2024

(54) GAS VALVE AND ELECTRONICALLY-CONTROLLED APPARATUS FOR PROPORTIONAL GAS MIXING

(71) Applicant: UNIVERSITY OF DOHA FOR SCIENCE & TECHNOLOGY, Doha (QA)

(72) Inventor: Awni Al-Otoom, Doha (QA)

(73) Assignee: UNIVERSITY OF DOHA FOR SCIENCE & TECHNOLOGY, Doha (QA)

( * ) Notice: Subject to any disclaimer, the term of this patent is extended or adjusted under 35 U.S.C. 154(b) by 0 days.

(21) Appl. No.: 18/130,314

(22) Filed: Apr. 3, 2023

(65) Prior Publication Data

US 2023/0321613 A1  Oct. 12, 2023

Related U.S. Application Data

(60) Provisional application No. 63/330,234, filed on Apr. 12, 2022.

(51) Int. Cl.
| | | |
|---|---|---|
| *B01F 23/10* | (2022.01) | |
| *F16K 5/06* | (2006.01) | |
| *F16K 11/087* | (2006.01) | |

(52) U.S. Cl.
CPC .......... *B01F 23/191* (2022.01); *F16K 5/0647* (2013.01); *F16K 11/0876* (2013.01)

(58) Field of Classification Search
CPC ... B01F 23/191; F16K 5/0647; F16K 11/0876
See application file for complete search history.

(56) References Cited

U.S. PATENT DOCUMENTS

| | | | | |
|---|---|---|---|---|
| 3,387,748 | A  * | 6/1968 | Brenchley | F16K 31/041 |
| | | | | 222/542 |
| 4,651,775 | A  * | 3/1987 | Okada | F16K 11/0873 |
| | | | | 137/625.3 |
| 8,290,631 | B2 * | 10/2012 | Sweeney | G05B 9/03 |
| | | | | 251/30.01 |
| 2017/0321815 | A1* | 11/2017 | Vuichard | F16K 11/0873 |
| 2019/0394735 | A1* | 12/2019 | Osuna Ibarra | H04L 43/0823 |

OTHER PUBLICATIONS

International Search Report and Written Opinion issued in the corresponding International Patent Application No. PCT/IB2023/053372 on Aug. 15, 2023.

* cited by examiner

*Primary Examiner* — Angelisa L. Hicks
(74) *Attorney, Agent, or Firm* — SQUIRE PATTON BOGGS (US) LLP

(57) ABSTRACT

Systems, methods, apparatuses, and computer program products for proportional gas mixing. A method for mixing gas may include receiving, at a modified ball valve, a first gas via a first gas input port of the modified ball valve, and a second gas via a second gas input port of the modified ball valve. The method may also include coupling a motor control device with the modified ball valve. The method may further include operating the modified ball valve via the motor control device by adjusting a position of the modified ball valve. In addition, the method may include releasing a gas mixture of the first gas and the second gas through a gas output port of the modified ball valve.

14 Claims, 6 Drawing Sheets

GAS VALVE AND ELECTRONICALLY-CONTROLLED APPARATUS FOR PROPORTIONAL GAS MIXING

CROSS-REFERENCE TO RELATED APPLICATIONS

This is a U.S. Track One Patent Application of U.S. Provisional Patent Application No. 63/330,234, filed on Apr. 12, 2022. The disclosure of the prior application is hereby incorporated by reference in its entirety.

FIELD

Some embodiments may generally relate to gas mixers. More specifically, certain embodiments may relate to apparatuses, systems, and/or methods for proportional gas mixing.

BACKGROUND

Various types of gas mixers have been provided. The need for efficient gas mixers has been established many years ago, particularly in the medical field. The need to use oxygen to treat patients for several reasons has been identified and researched since the early 1950s. An example of such gas mixer include oxygen blender devices that are used to enrich air stream with oxygen for various medical needs. An objective of the development of these devices or apparatuses is to achieve oxygen concentration ranging from 21% to 100% based on the need basis.

In early gas mix technology, the properties of each gas to be mixed may be used in the design of the mixer and therefore, one device used to mix two gasses cannot be used to mix two other gases since the shapes and the internal components would need to be changed. Other gas mixers may also depend on sensing of concentration of the mixed gases and provide a feedback signal to a controller to adjust pressures and volumetric flow rate of individual gases. However, the use of sensors, regulating valves, and controllers would make the product significantly more expensive and more complicated and prone to instability.

Other products in the field are highly complicated with difficulties installing and disassembling in emergency situations. In addition, previous systems have complicated control systems that are prone to failure and long troubleshooting time. Thus, in emergency situations, they can become non-practical to use without having standby alternative devices. Additionally, they can be extremely expensive. Accordingly, there is a need for a simple and inexpensive apparatus that eliminates issues with the previous mixers described above.

SUMMARY

Certain embodiments may be directed to a method for mixing gas. The method may include receiving, at a modified ball valve, a first gas via a first gas input port of the modified ball valve, and a second gas via a second gas input port of the modified ball valve. The method may also include coupling a motor control device with the modified ball valve. The method may further include operating the modified ball valve via the motor control device by adjusting a position of the ball valve. In addition, the method may include releasing a gas mixture of the first gas and the second gas through a gas output port of the modified ball valve.

Other embodiments may be directed to a gas mixing apparatus. The apparatus may include a modified ball valve. The apparatus may also include a motor control device configured to operate the modified ball valve. The apparatus may further include a coupler configured to couple the motor control device with the modified ball valve. In certain embodiments, the modified ball valve may include a first gas input port, a second gas input port, a gas output port, and a plate disposed inside a hollow space in the modified ball valve. In other embodiments, the motor control device may be configured to adjust a position of the modified ball valve to produce a desired amount of gas.

Other embodiments may be directed to a gas distribution device. The gas distribution device may include a modified ball valve. The gas distribution device may also include a first gas input port located at a first side of the modified ball valve. The gas distribution device may further include a second gas input port located at a second side of the modified ball valve. In addition, the gas distribution device may include an output port located at a third side of the modified ball valve. Further, the gas distribution device may include a plate disposed inside a hollow space in the modified ball valve.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Figure 1:
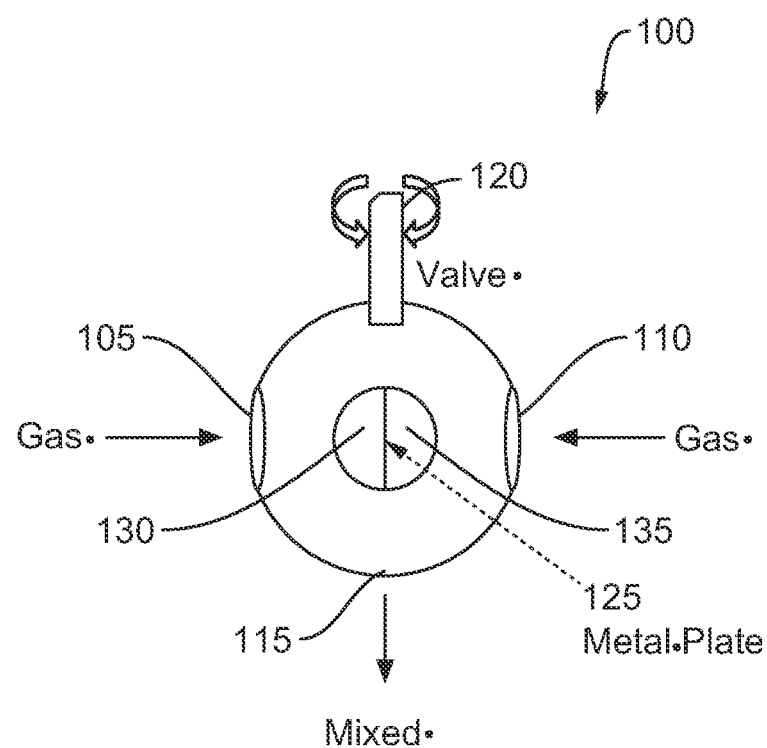
FIG. 1 illustrates an example schematic of a modified ball valve, according to certain embodiments.

It will be readily understood that the components of certain example embodiments, as generally described and illustrated in the figures herein, may be arranged and designed in a wide variety of different configurations. The following is a detailed description of some embodiments for proportional gas mixing.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments may relate to a controlled gas proportioning process. For instance, certain embodiments may provide an apparatus that may be configured to mix oxygen and air in different concentrations. This may be accomplished by incorporating a microcontroller (e.g., Arduino microcontroller) and a modified three-way ball valve. The modified three-way ball valve may be utilized in an oxygen or air mixing apparatus, and the apparatus may further include an oxygen input line, an air input line, a servomotor, a potentiometer, and a microcontroller.

According to certain embodiments, the microcontroller may be configured to adjust the position of the modified ball valve using the servomotor. In doing so, it may be possible to adjust the percentage of gasses in the output stream of the modified ball valve. According to some example embodiments, the servomotor may be a rotary actuator or linear actuator that allows for precise control of angular or linear position, velocity, and acceleration. The servomotor may include a suitable motor coupled to a sensor for position feedback, and may also include a servo drive to complete the system. The drive may use the feedback sensor to precisely control the rotary position of the motor. In addition, the servomotor may operate in tandem with the microcontroller, and be controlled via a variable signal of 0-5 VDC from the microcontroller. In some example embodiments, the signal may be adjusted for variable percentage using the potentiometer. The control of the input voltage variable can be replaced by a remote Bluetooth® or WIFI signals. According to certain embodiments, the ball valve may be adjusted to have two compartments separated by welding a metal plate in the center of the ball valve. In some embodiments, the two compartments may have identical volumes.

In certain embodiments, the modified three-way ball valve may provide a solution to mixing air and oxygen streams used in various medical applications including, for example, in medical ventilators to provide the needed oxygen percentage as per the specifications of the medical personnel. In other embodiments, the modified three-way ball valve may be used in applications where a mixing of the right quantities of gases is needed, and may be modified to perform certain desired or required functions.

FIG. 1 illustrates a schematic of the modified three-way ball valve 100, according to certain embodiments. As illustrated in FIG. 1, the modified three-way ball valve 100 may include two input lines/ports 105, 110, an output line/port 115, a valve stem 120 that may be used to adjust the position of a metal plate 125 inside the ball to valve 100 to different positions by rotating the valve stem 120 to different angles. In some embodiments, either one of the input lines/ports 105, 110 may be used to supply oxygen gas and medical air or any other type of air into the modified three-way ball valve 100 by connecting a gas line, hose, or valve to the modified three-way ball valve 100. In other words, the modified three-way ball valve 100 may be connected to an oxygen stream source and an air stream source at the input lines 105, 110, and connected to an output at the output line (combination of 130 and 135 compartments). Once the gases are supplied into the modified three-way ball valve 100, they may be mixed together, and dispensed from the modified three-way ball valve 100 through the output line (combination of 130 and 135 compartments). The gases used herein may not be limited to oxygen, and other types of gases may be used in other embodiments.

Figure 2:
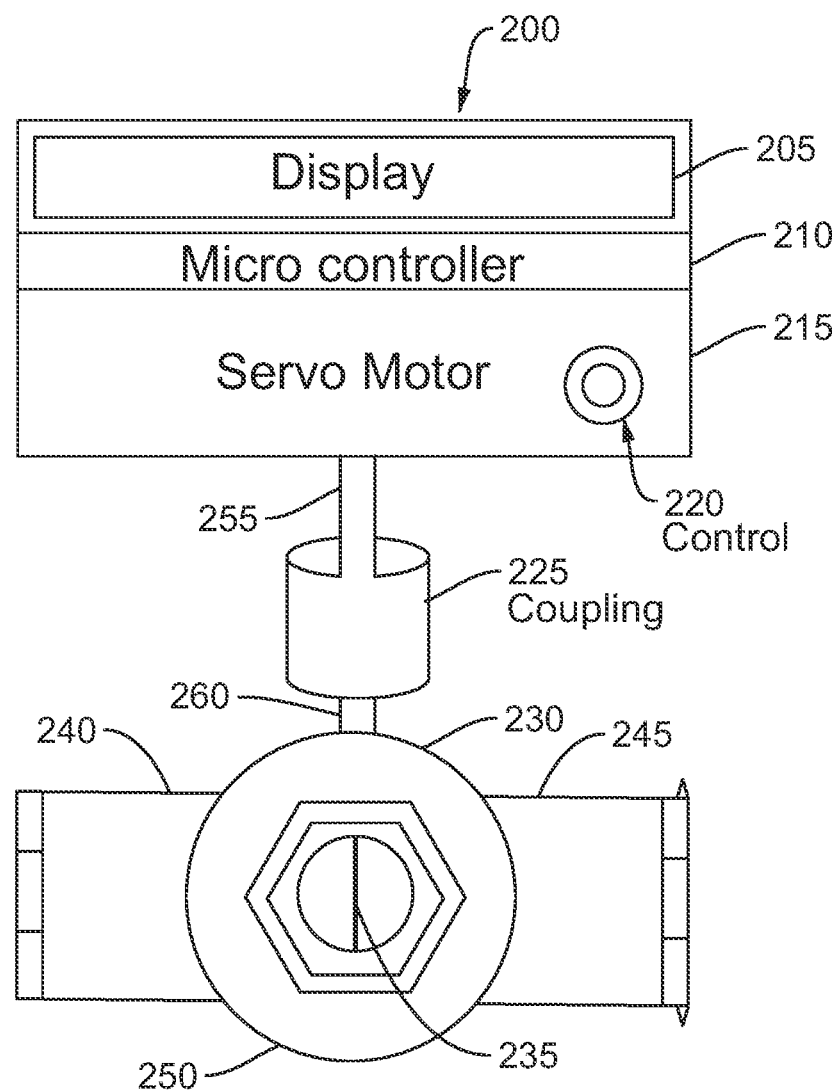
FIG. 2 illustrates an example schematic of a front view of a system with the modified ball valve, according to certain embodiments.

As illustrated in FIG. 1, the modified three-way ball valve 100 may also have a hollow interior space that may be divided into two compartments 130, 135 via the metal plate 125 positioned at the center of the outlet port 115. The compartments, in conjunction with the other components of the modified three-way ball valve 100 may provide the ability to produce a predictable oxygen quantity ranging from about 21% to about 100%. For instance, according to some embodiments, the quantity of oxygen may be controlled by the rotation of the valve stem 120 electromechanically through rotation of the servomotor. Additionally, the shaft 255 (FIG. 2) of the servomotor may be coupled with the stem 260 (FIG. 2) of the modified three-way ball valve through a mechanical coupling 225 (FIG. 2). In other embodiments, a signal ranging from 0-5 VDC may be sent from the microcontroller to adjust the angle of rotation of the valve stem 120 and, thus, adjusting the percentage of oxygen and air in the mixed stream. According to certain embodiments, the percentage of oxygen may change with the rotation angle parabolically. For example if the rotation angle is 0 degrees, then the oxygen percentage is 63%, while if the rotation angle is 50 degrees, then the oxygen percentage is 100%, and if the rotation angle is 100 degrees, then the oxygen percentage is 42%.

FIG. 2 illustrates an example schematic of a front view of a system with the modified three-way ball valve, according to certain embodiments. As noted above, in certain embodiments, the system may be operated (e.g., controlling the modified ball valve) wirelessly/remotely via Bluetooth® or WIFI. As illustrated in FIG. 2, the system may include motor control apparatus 200. The motor control apparatus 200 may include a display 205 to show the oxygen/air percentage, microcontroller 210, and servomotor 215. In some embodiments, the servomotor 215 may include a control in a form of potentiometer 220 used to control the operations of the servomotor and, thus, the rotation angle of the modified ball valve, and hence the percentage of oxygen/air as indicated by the display. Connected to the servomotor 215 is a coupler 225, which couples the modified three-way ball valve 230 with the motor control apparatus 200 by coupling the shaft 255 of the servomotor 215 with the stem 260 of the modified three-way ball valve 230. Similar to FIG. 1, the modified three-way ball valve 230 may include inlet lines/ports 240, 245, and an outlet line/port 250. The modified three-way ball valve 230 may further include a metal plate 235, similar to the metal plate 125 illustrated in FIG. 1.

Figure 3:
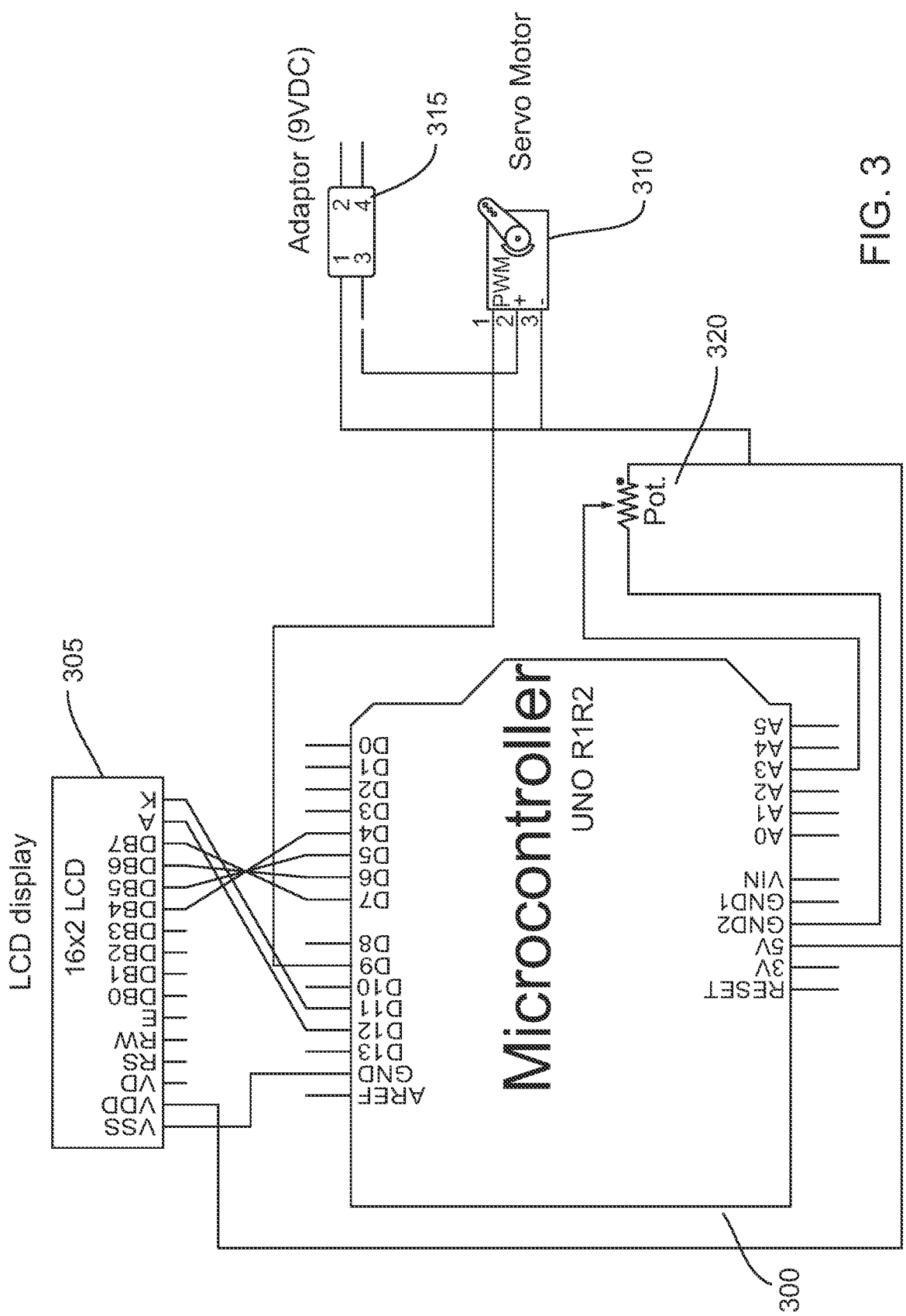
FIG. 3 illustrates an example electrical connection schematic of the system, according to certain embodiments.

FIG. 3 illustrates an example electrical connection schematic of the system, according to certain embodiments. As illustrated in the example schematic of FIG. 3, the microcontroller 300 may be electrically connected to the LCD display 305, servomotor 310, adaptor 315, potentiometer 320. In certain embodiments, the adaptor 315 may provide a 9 VDC to the system, and the potentiometer 320 may adjust the voltage between 0-5V.

Figure 4:
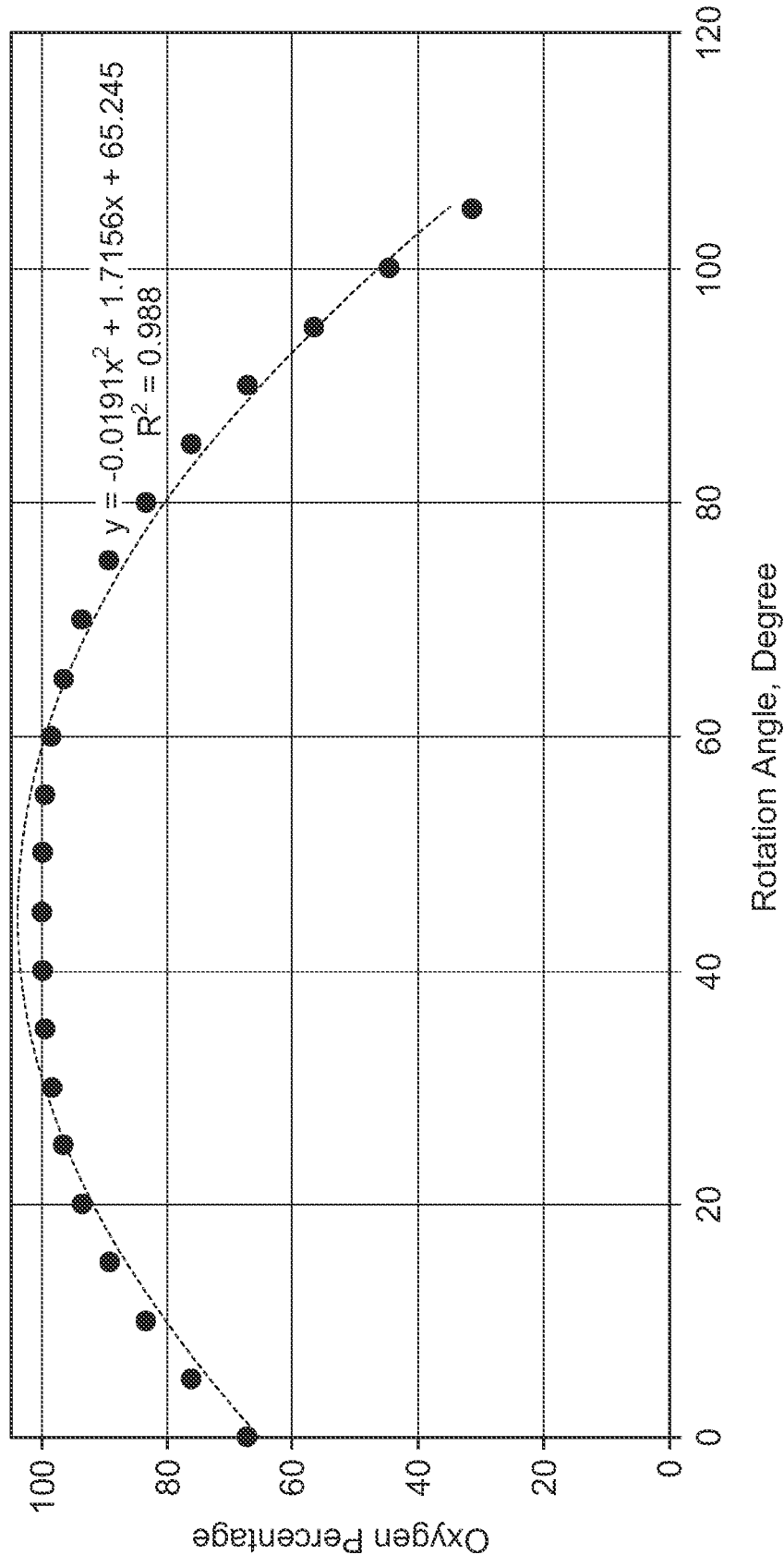
FIG. 4 illustrates an example calibration curve, according to certain embodiments.

FIG. 4 illustrates an example calibration curve, according to certain embodiments. In particular, FIG. 4 illustrates a calibration curve between the rotation angle of the modified ball valve and the oxygen percentage in the outlet stream. According to certain embodiments, the calibration curve may be established between the rotation angle of the servomotor and the direct voltage value sent from the microcontroller.

Figure 5:
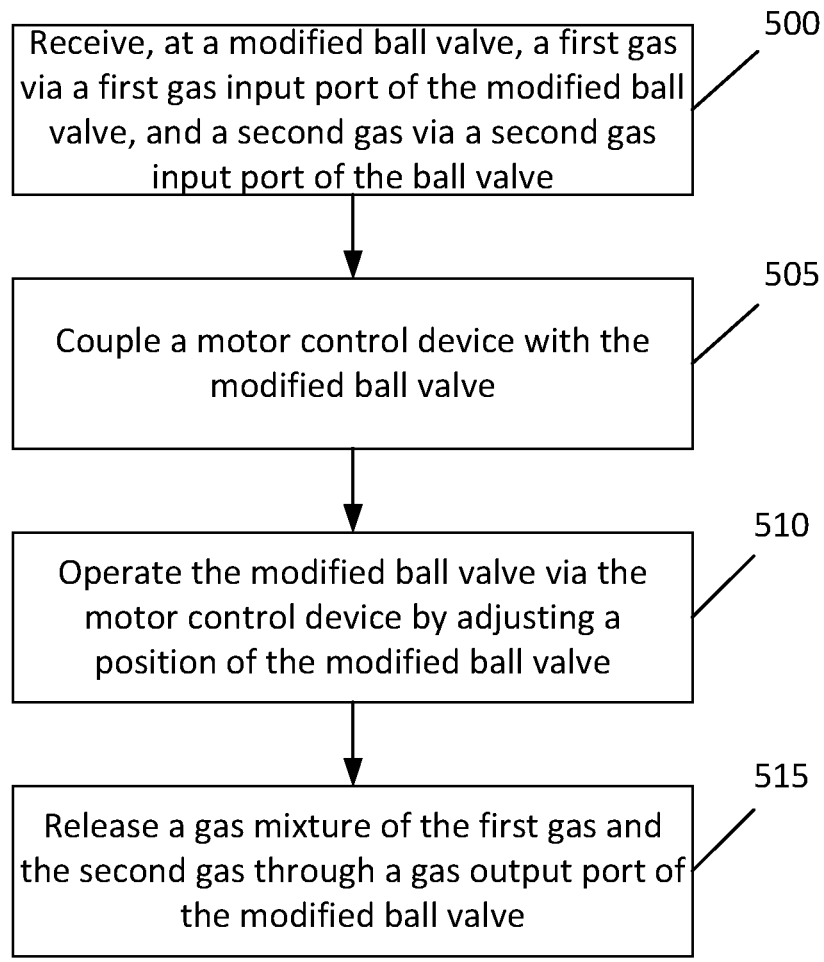
FIG. 5 illustrates a flow diagram of a method, according to certain embodiments.

FIG. 5 illustrates a flow diagram of a method, according to certain embodiments. In certain embodiments, the flow diagram of FIG. 5 may be performed by a system similar to that illustrated in FIG. 2.

According to one embodiment, the method of FIG. 5 may include, at 500, receiving, at a modified ball valve, a first gas via a first gas input port of the modified ball valve, and a second gas via a second gas input port of the modified ball valve. The method may also include, at 505, coupling a motor control device with the modified ball valve. The method may further include, at 510, operating the modified ball valve via the motor control device by adjusting a position of the modified ball valve. In addition, the method may include, at 515, releasing a gas mixture of the first gas and the second gas through a gas output port of the modified ball valve.

According to certain embodiments, the modified ball valve may include a stem and a compartment separator, the motor control device may include a shaft, and the coupling may be performed by mechanically coupling the shaft with the stem via a coupler. According to some embodiments, the method may further include adjusting a position of the modified ball valve via a microcontroller, and receiving, at a servomotor, a signal from the microcontroller to adjust an angle of rotation of the modified ball valve. According to other embodiments, the method may also include sending, via the microcontroller to the servomotor, a signal ranging from 0 to 5 VDC.

In certain embodiments, the method may also include receiving, at a first compartment of the modified ball valve, a first gas via a first gas input port. In some embodiments, the method may further include receiving, at a second compartment of the modified ball valve, a second gas via a second gas input port. In other embodiments, the method may include combining the first gas with the second gas. Further, in certain embodiments, the method may include releasing a combined gas mixture of the first gas and the second gas via the gas output port.

Figure 6:
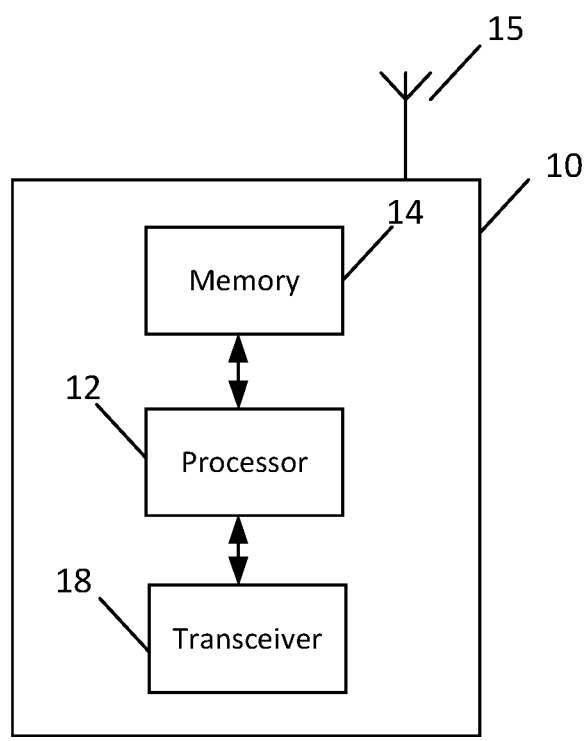
FIG. 6 illustrates an apparatus, according to certain embodiments.

FIG. 6 illustrates an apparatus according to certain embodiments. According to certain embodiments, apparatus 10 may be a computing device. As described herein, a computing device may alternatively be referred to as, for example, a computer, hardware device, mobile device, or the like.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 6.

As illustrated in the example of FIG. 6, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RANI), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some embodiments, apparatus 10 may also include or be coupled to one or more antennas 15 for receiving a signal and for transmitting from apparatus 10. Apparatus 10 may further include a transceiver 18 configured to transmit and receive information. For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with other hardware elements described herein via a wireless or wired communications link.

According to certain example embodiments, processor 12 and memory 14 may be included in or may form a part of processing circuitry or control circuitry. In addition, in some embodiments, transceiver 18 may be included in or may form a part of transceiving circuitry. As discussed above, according to certain example embodiments, apparatus 10 may be a controller for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to operate the modified ball valve by adjusting a position of the modified ball valve. Apparatus 10 may also be controlled by memory 14 and processor 12 to release a gas mixture of a first gas and a second gas through a gas output port of the modified ball valve.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving, at a modified ball valve, a first gas via a first gas input port of the modified ball valve, and a second gas via a second gas input port of the modified ball valve. The apparatus may also include means for coupling a motor control device with the modified ball valve. The apparatus may further include means for operating the modified ball valve via the motor control device by adjusting a position of the modified ball valve. In addition, the apparatus may include means for releasing a gas mixture of the first gas and the second gas through a gas output port of the modified ball valve.

Certain embodiments described herein provide several technical improvements, enhancements, and/or advantages. In some embodiments, it may be possible to eliminate issues exhibited by previous mixers. According to certain embodiments, the mixing apparatus may be used with any gas combination by controlling an internally modified three-way valve, and providing dedicated volume proportions of each gas to the outlet port. In certain embodiments, the mixing apparatus may have an electronically adjustable percentage of the mixed gas as needed through rotation of the stem of the modified three-way valve.

As described herein, a computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of code may be in a source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

I claim:

1. A gas mixing apparatus, comprising:
   a modified ball valve;
   a motor control device configured to operate the modified ball valve; and
   a coupler configured to couple the motor control device with the ball valve,
   wherein the modified ball valve comprises a stem,
   wherein the modified ball valve comprises a first gas input port, a second gas input port, a gas output port, and a plate disposed inside a hollow space in the modified ball valve, and
   wherein the motor control device is configured to adjust a position of the plate via adjustment of the stem to produce a desired amount of gas.

2. The gas mixing apparatus according to claim 1, wherein the motor control device comprises a shaft, and wherein the shaft is mechanically coupled with the stem via the coupler.

3. The gas mixing apparatus according to claim 1, wherein the motor control device comprises:
   a display;
   a microcontroller configured to adjust a position of the plate; and
   a servomotor configured to receive a signal from the microcontroller to adjust an angle of rotation of the modified ball valve.

4. The gas mixing apparatus according to claim 3, wherein the microcontroller is configured to send a signal to the servomotor ranging from 0 to 5 VDC.

5. The gas mixing apparatus according to claim 1, wherein the modified ball valve comprises:

a first compartment configured to house a first gas received via the first gas input port; and a second compartment configured to house a second gas received via the second gas input port.

6. The gas mixing apparatus according to claim 5, wherein the gas output port is configured to combine the first gas with the second gas, and release a combined gas mixture of the first gas and the second gas.

7. A method for mixing gas, comprising:

receiving, at a modified ball valve, a first gas via a first gas input port of the modified ball valve, and a second gas via a second gas input port of the modified ball valve, wherein the modified ball valve comprises a stem;

coupling a motor control device with the modified ball valve;

operating the modified ball valve via the motor control device by adjusting the position of a plate in the modified ball valve via adjustment of the stem; and releasing a gas mixture of the first gas and the second gas through a gas output port of the modified ball valve.

8. The method for mixing gas according to claim 7, wherein the motor control device comprises a shaft, and wherein the coupling is performed by mechanically coupling the shaft with the stem via a coupler.

9. The method for mixing gas according to claim 7, further comprising:

adjusting the position of the plate via a microcontroller of the motor control device; and receiving, at a servomotor, a signal from the microcontroller to adjust an angle of rotation of the modified ball valve.

10. The method for mixing gas according to claim 9, further comprising:

sending, via the microcontroller to the servomotor, a signal ranging from 0 to 5 VDC.

11. The method for mixing gas according to claim 7, further comprising:

receiving, at a first compartment of the modified ball valve, a first gas via a first gas input port; and receiving, at a second compartment of the modified ball valve, a second gas via a second gas input port.

12. The method for mixing gas according to claim 11, further comprising:

combining the first gas with the second gas; and releasing a combined gas mixture of the first gas and the second gas via the gas output port.

13. A gas distribution device, comprising:

a modified ball valve;

a first gas input port located at a first side of the modified ball valve;

a second gas input port located at a second side of the modified ball valve;

an output port located at a third side of the modified ball valve;

a plate disposed inside a hollow space in the modified ball valve; and a stem attached to a coupler, wherein the modified ball valve is configured to release a predetermined amount of a gas mixture comprising an amount of the first gas and an amount of the second gas by changing a position of the plate via adjustment of the stem.

14. The gas distribution device according to claim 13, wherein modified ball valve is configured to release a predetermined amount of a gas mixture comprising an amount of the first gas and an amount of the second gas by changing a position of the plate.

* * * * *